United States Patent
Watts

(10) Patent No.: US 11,008,175 B1
(45) Date of Patent: May 18, 2021

(54) MULTI-DIRECTIONAL BALL ROTATION APPARATUS FOR MANEUVERING AN ITEM

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 0 days.

(21) Appl. No.: 16/810,587

(22) Filed: Mar. 5, 2020

Related U.S. Application Data

(60) Provisional application No. 62/816,086, filed on Mar. 9, 2019.

(51) Int. Cl.
*B65G 39/02* (2006.01)
*B65G 13/06* (2006.01)

(52) U.S. Cl.
CPC ............ *B65G 39/025* (2013.01); *B65G 13/06* (2013.01)

(58) Field of Classification Search
CPC ....... B65G 39/025; B65G 13/06; B65G 13/12
USPC .............................. 198/780–791; 193/35 MD
See application file for complete search history.

(56) References Cited

U.S. PATENT DOCUMENTS

| | | | |
|---|---|---|---|
| 3,501,038 A | 3/1970 | Blinder | |
| 3,638,502 A | 2/1972 | Leavitt et al. | |
| 3,888,342 A * | 6/1975 | Geller | B65G 39/025 198/789 |
| 5,238,099 A | 8/1993 | Schroeder et al. | |
| 5,261,529 A * | 11/1993 | Holland | A47F 7/02 206/486 |
| 5,921,374 A * | 7/1999 | Takino | B65G 47/54 193/35 MD |
| 9,505,557 B2 * | 11/2016 | Wilkins | B65G 47/54 |
| 9,745,143 B2 * | 8/2017 | Wilkins | B65G 47/53 |
| 9,878,856 B2 * | 1/2018 | Specht | B65G 13/02 |
| 9,975,719 B2 * | 5/2018 | Muhl | B65H 3/5238 |
| 10,793,364 B1 * | 10/2020 | Skarlupka | B65G 39/025 |
| 2014/0116841 A1 * | 5/2014 | Wilkins | B65G 13/065 198/369.1 |
| 2016/0101958 A1 * | 4/2016 | Park | B65H 9/002 271/234 |
| 2020/0122932 A1 * | 4/2020 | Guglielmi | B65G 39/025 |

* cited by examiner

*Primary Examiner* — Mark A Deuble
(74) *Attorney, Agent, or Firm* — Plager Schack LLP; Mark H. Plager; Michael J. O'Brein

(57) ABSTRACT

A multi-directional ball rotation apparatus designed to maneuver an item in a plurality of directions is provided. The ball rotation apparatus includes a main housing, a first motor coupled to the main housing and having a first rotatable spindle, a shaft rotatably mounted to the main housing and operably connected to the first spindle of the motor, and a spherical member coupled to the shaft and designed to engage the item. The first spindle of the first motor is designed to rotate in a first direction to rotate the spherical member and item in a first direction. The first spindle of the first motor is designed to rotate in a second direction to rotate the spherical member and item in a second direction.

9 Claims, 4 Drawing Sheets

MULTI-DIRECTIONAL BALL ROTATION APPARATUS FOR MANEUVERING AN ITEM

RELATED APPLICATION

The application claims priority to provisional patent application U.S. Ser. No. 62/816,086 filed on Mar. 9, 2019, the entire contents of which is herein incorporated by reference.

BACKGROUND

The embodiments herein relate generally to ball rotation devices. More specifically, embodiments of the invention are directed to a multi-directional ball rotation apparatus for maneuvering an item.

In a wide variety of fields such as the film, robotics and manufacturing industries, there is a need for devices that secure, move, rotate and/or transport items. These are particularly important for the film industry, where a camera head has to be secured, moved and/or rotated to capture video. In the robotics and manufacturing industries, different components have to be maneuvered and oriented as needed to facilitate the assembly and production of consumer products.

Several devices for moving items are disclosed in U.S. Pat. Nos. 5,238,099, 3,501,038 and 2,628,462, which comprise rotating members or balls that are used to transport and/or maneuver the desired items. However, these devices are limited because they do not allow for controlled adjustability that enables a user to quickly change the direction of movement of the secured item with ease. Further, these devices are specialized to the extent that they cannot be easily used in a wide variety of industries.

As such, there is a need in the industry for a multi-directional ball rotation apparatus that addresses the limitations of the prior art, which allows a user to control the movement and directional changes of a secured item quickly with minimal effort. There is a further need for the multi-directional ball rotation apparatus to be beneficial for use in different industries.

SUMMARY

In certain embodiments of the invention, a multi-directional ball rotation apparatus configured to maneuver an item in a plurality of directions is provided. The ball rotation apparatus comprises a main housing comprising a pair of opposing side plates coupled to a base plate, a first motor coupled to the main housing and positioned within the pair of opposing side plates and base plate, the motor comprising a first rotatable spindle, a shaft rotatably mounted to the pair of opposing side plates of the main housing and operably connected to the first spindle of the motor, and a spherical member coupled to the shaft and configured to engage the item, wherein rotational movement of the first spindle is configured to drive the shaft to rotate the spherical member laterally, thereby maneuvering the item in one of the plurality of directions; wherein the first spindle of the first motor is configured to rotate in a first direction to rotate the spherical member and item in a first direction, wherein the first spindle of the first motor is configured to rotate in a second direction to rotate the spherical member and item in a second direction.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
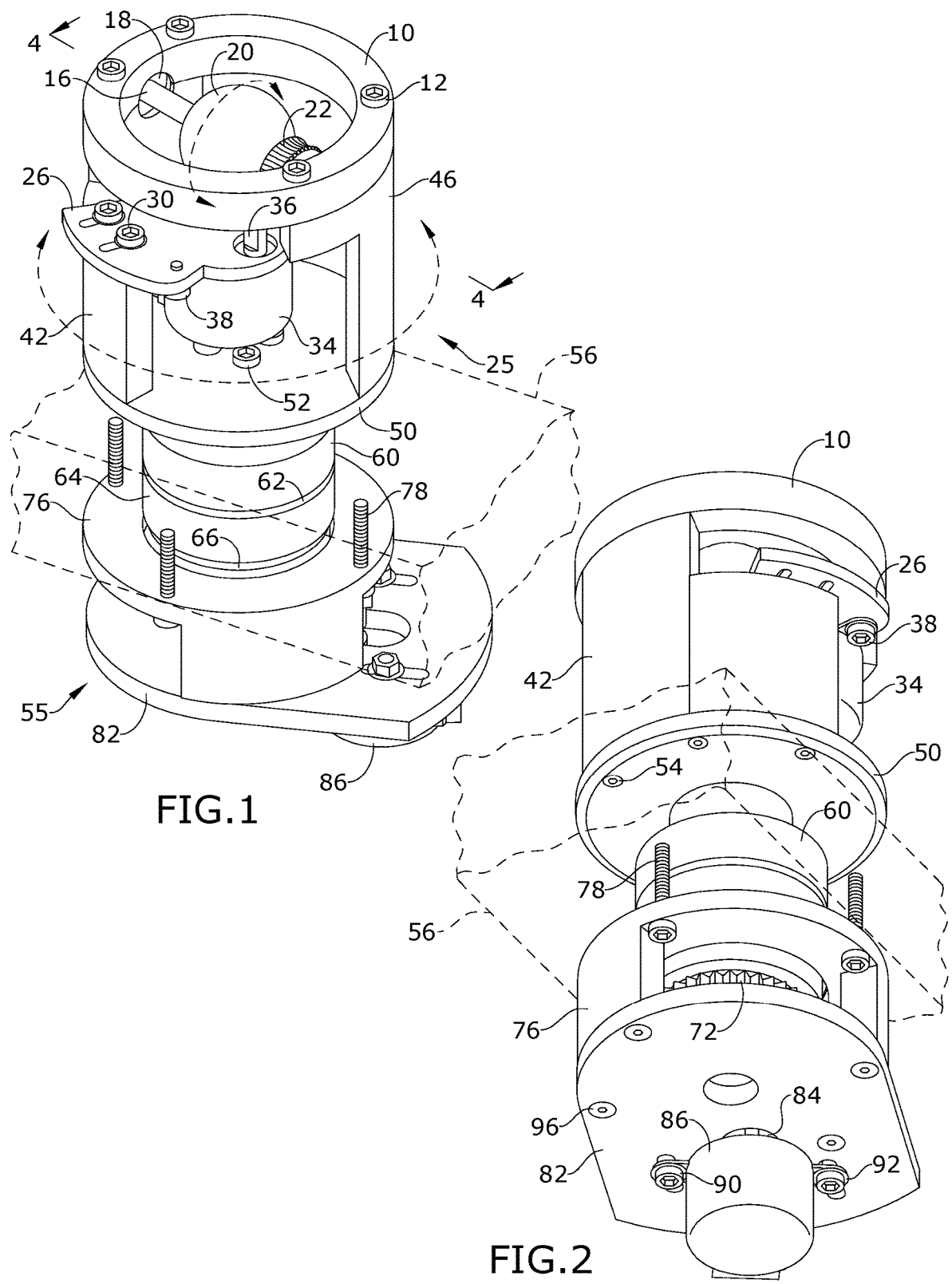
FIG. 1 depicts a top perspective view of certain embodiments of the ball rotation apparatus.
FIG. 2 depicts a bottom perspective view of certain embodiments of the ball rotation apparatus.
Figure 3:
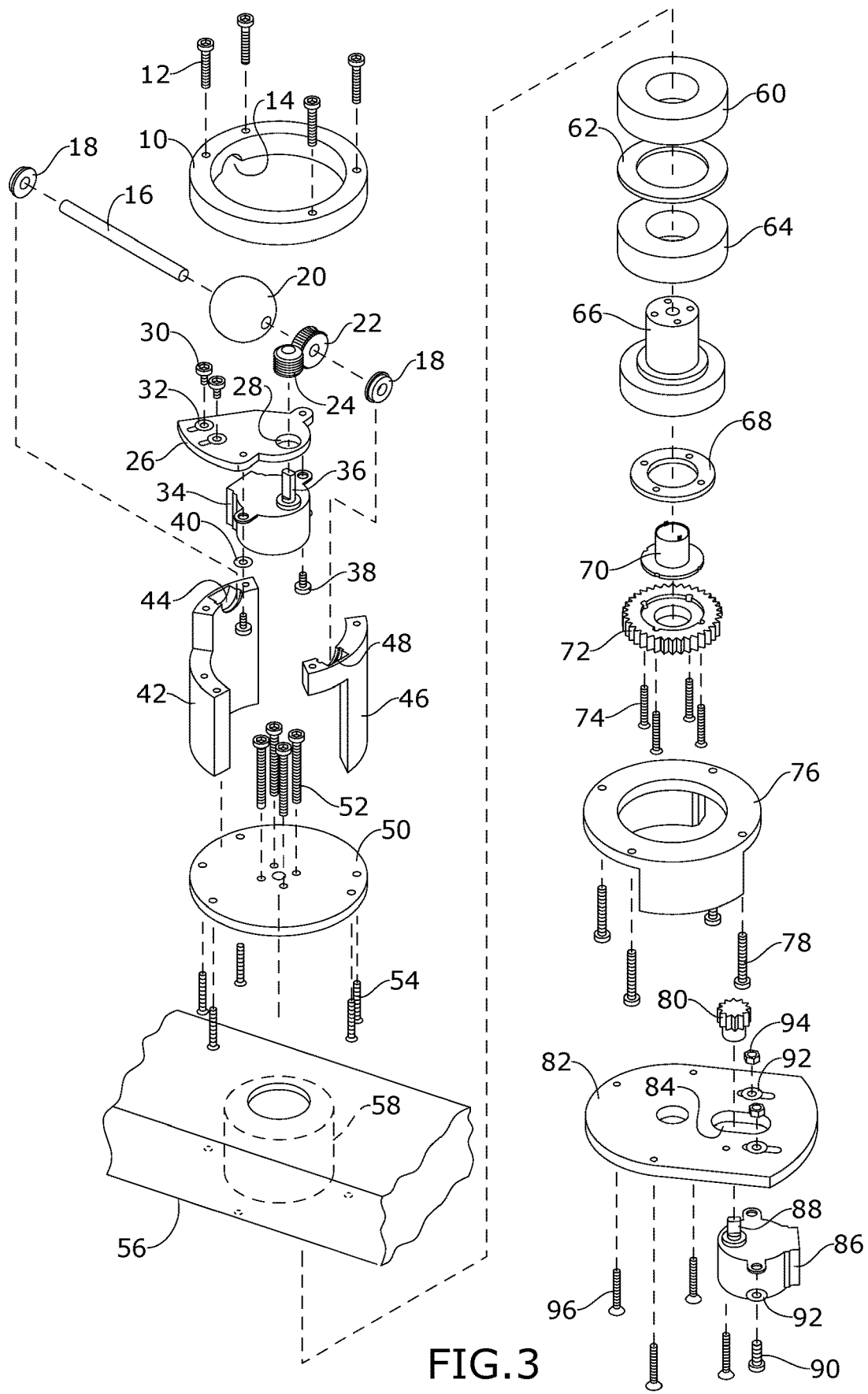
FIG. 3 depicts an exploded view of certain embodiments of the ball rotation apparatus.
Figure 6:
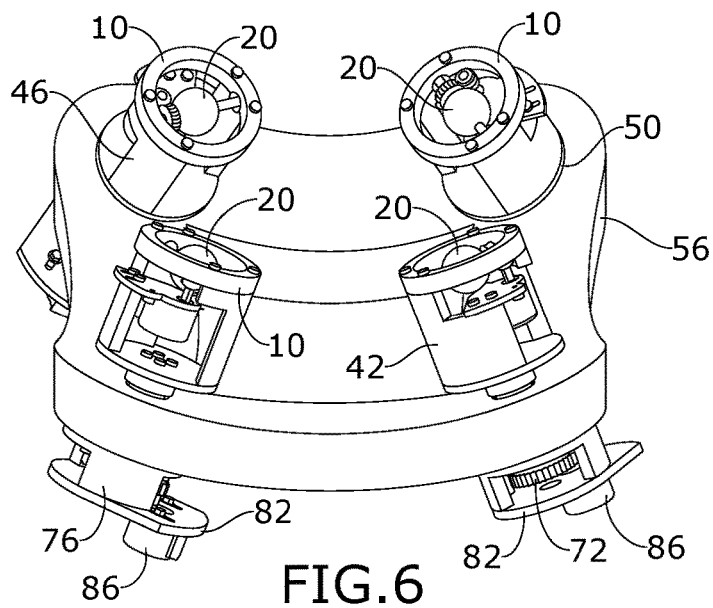
FIG. 6 depicts a perspective view of certain embodiments of the ball rotation apparatus illustrating the assembly of multiple ball rotation apparatuses.
Figure 7:
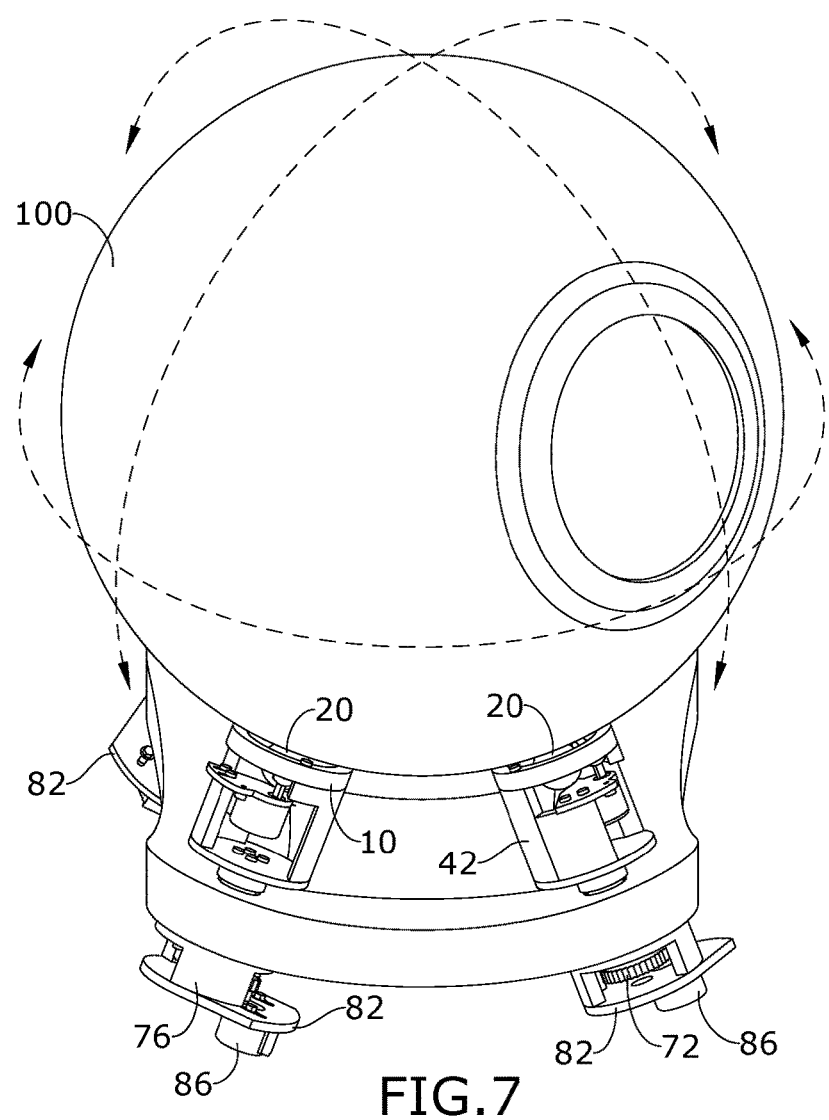
FIG. 7 depicts a perspective view of certain embodiments of the ball rotation apparatus illustrating the assembly and use of multiple ball rotation apparatuses at the same time.

In certain embodiments as depicted in FIGS. 1-3, the multi-directional ball rotation apparatus generally comprises spherical member 20, main housing 25 and lower housing 55, and is configured to maneuver a secured item (not shown) in a plurality of directions. The secured item is configured to attach to spherical member 20, either directly or indirectly via any number of mounting brackets, plates and the like. As a result, controlled movement of spherical member 20 in a plurality of directions allows the secured item to travel in the corresponding plurality of directions. In one embodiment as depicted in FIGS. 6-7, a plurality of the multi-directional ball rotation apparatuses are secured together to maneuver a secured item in a plurality of directions as will be described in more detail in the embodiments that follow.

For simplicity, the components of a single multi-directional ball rotation apparatus will be described in detail. In one embodiment as depicted in FIGS. 1-4, main housing 25 of the ball rotation apparatus comprises top motor plate 26, first side plate 42, second side plate 46 and base plate 50. First and second side plates 42, 46 are coupled to base plate 50 by main housing screws 54. In one embodiment, top motor plate 26 comprises spindle hole 28 and a pair of top plate washers 32. In one embodiment, top motor plate 26 is coupled to first side plate 42 by a pair of top plate screws 30.

In one embodiment, top motor 34 is coupled to top motor plate 26 by top motor washers 40 and top motor screws 38. In this embodiment, top motor 34 comprises top motor spindle 36, which extends through top spindle hole 28 in top motor plate 26. It shall be appreciated that top motor 34 can have variable specifications depending on the application or field of use of the ball rotation apparatus. In one embodiment as depicted in FIG. 3, worm 24 is coupled to top motor spindle 36 of top motor 34. Worm 24 is configured to engage with worm gear 22.

Figure 4:
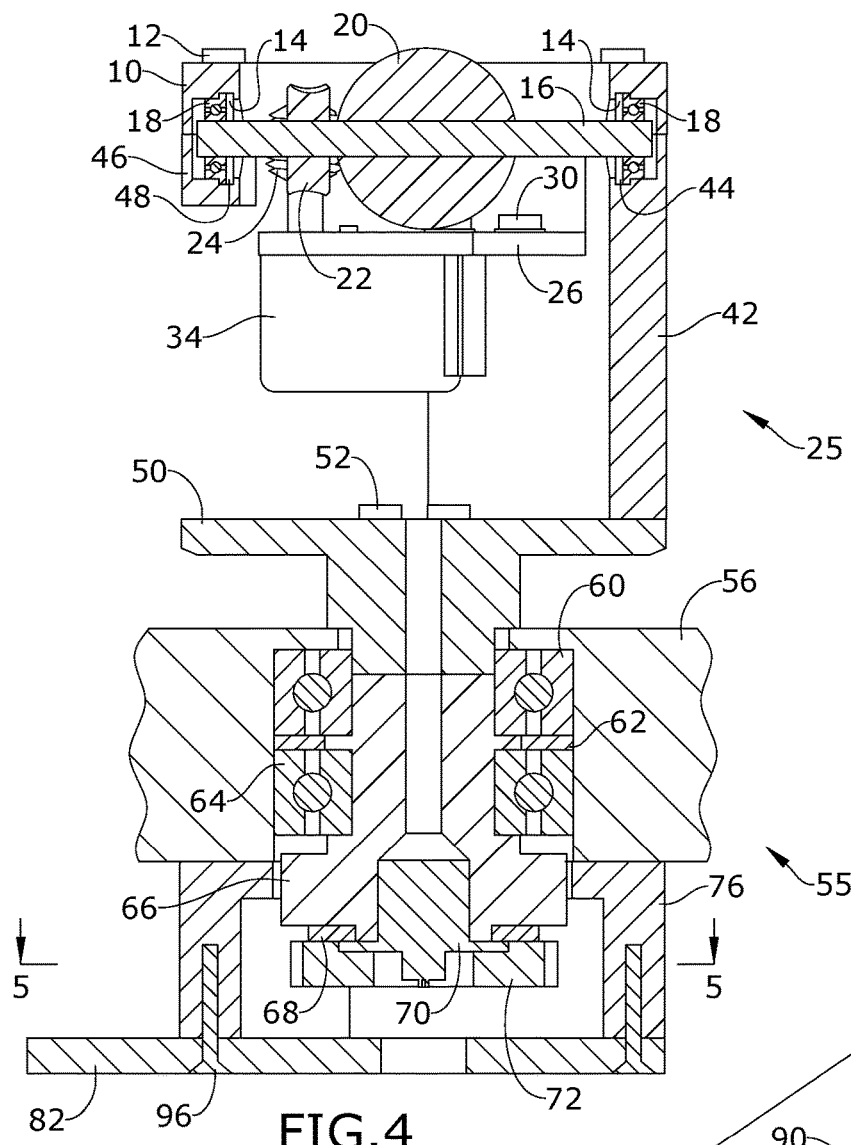
FIG. 4 depicts a section view of certain embodiments of the ball rotation apparatus taken along line 4-4 in FIG. 1.

In one embodiment as depicted in FIGS. 3-4, spherical member 20 is rotatably mounted to first and second side plates 42, 46 by shaft 16 and a pair of shaft bearings 18. More specifically, first side plate 42 comprises first bearing notch 44 and second side plate 46 comprises second bearing notch 48. First and second bearing notches 44, 48 receive the pair of shaft bearings 18.

In one embodiment as depicted in FIGS. 3-4, top support ring 10 is coupled to first and second side plates 42, 46 by upper screws 12. Top support ring 10 comprises a pair of ring notches 14 that align with first and second bearing notches 44, 48 of first and second side plates 42, 46. In this embodiment, the pair of shaft bearings 18 remain seated within first and second bearing notches 44, 48 of first and second side plates 42, 46 and ring notches 14 of top support ring 10.

In one embodiment, shaft 16 comprises opposing ends that are coupled to the pair of shaft bearings 18. In one embodiment as depicted in FIGS. 1 and 3-4, shaft 16 extends entirely through spherical member 20 and worm gear 22. In a preferred embodiment, shaft 16 is coupled to spherical member 20 such that there is no slippage between the components when shaft 16 rotates. In one embodiment, spherical member 20 can be made from variable materials including, but not limited to, steel, ferromagnetic materials, plastic, rubber or other materials. In one embodiment, spherical member 20 comprises an approximate diameter of 1". However, the size of spherical member 20 can vary in alternative embodiments.

In operation, activation of top motor 34 rotates top motor spindle 36 in the clockwise or counterclockwise directions. This rotational movement rotates worm 24, which drives worm gear 22. The rotation of worm gear 22 rotates shaft 16, which rotates spherical member 20 laterally as illustrated by the upper arrow in FIG. 1. In one embodiment, the rotation of top motor spindle 36 in a first direction rotates spherical member 20 and any secured item thereto in a first direction. The rotation of top motor spindle 36 in a second direction rotates spherical member 20 and any secured item thereto in a second direction.

In one embodiment as depicted in FIGS. 1-4, lower housing 55 is coupled to upper housing 25 and generally comprises support block 56, spacer housing 76 and bottom motor plate 82. In one embodiment, support block 56 is coupled to main housing 25 and comprises internal cavity 58. Support block 56 can be made from any material such as plastic, metal or other materials, and have variable dimensions.

In one embodiment as depicted in FIGS. 3-4, internal cavity 58 of support block 56 is configured to house a plurality of components including at least first lower bearing 60, bearing spacer 62, second lower bearing 64 and coupler 66. As depicted in FIG. 4, base plate 50 comprises a lower protrusion that extends into the top of internal cavity 58. A plurality of coupling screws 52 secure base plate 50 to coupler 66. This helps to secure upper housing 25 to lower housing 55.

In one embodiment as depicted in FIGS. 3-4, a plurality of spacer housing screws 78 secure spacer housing 76 to support block 56. A plurality of bottom motor plate screws 96 secure bottom motor plate 82 to the bottom of spacer housing 76.

In one embodiment, bottom motor plate 82 comprises bottom spindle hole 84. Bottom motor 86 is coupled to bottom motor plate 82 by a pair of bottom motor plate screws 90, a plurality of bottom motor washers 92, and a pair of bottom motor plate nuts 94. In one embodiment as depicted in FIG. 3, bottom motor spindle 88 extends through bottom spindle hole 84 in bottom motor plate 82. It shall be appreciated that bottom motor 86 can have variable specifications depending on the application or field of use of the ball rotation apparatus.

Figure 5:
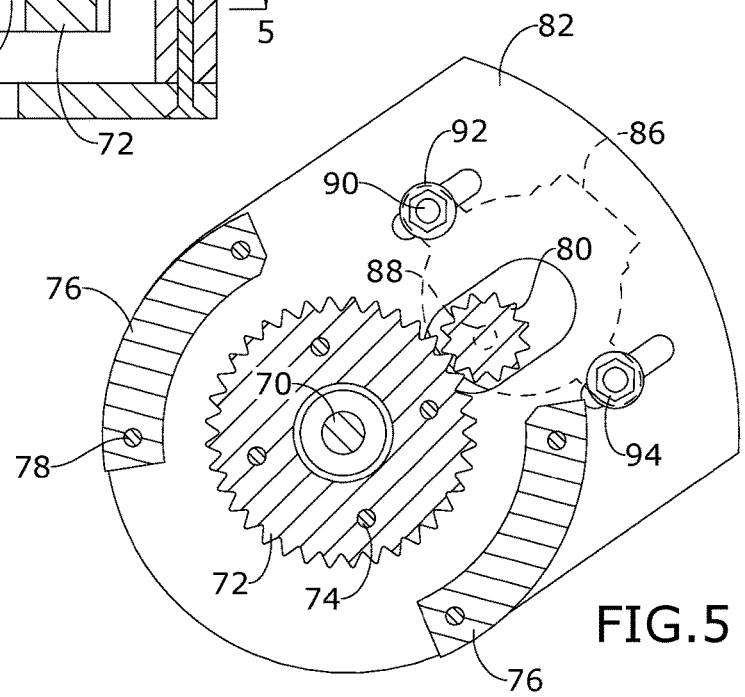
FIG. 5 depicts a section view of certain embodiments of the ball rotation apparatus taken along line 5-5 in FIG. 4.

In one embodiment as depicted in FIGS. 3-5, bottom motor 86 is configured to rotate main housing 25 and spherical member 20 clockwise or counterclockwise using a series of linkage components including spur gear 72 and pinion gear 80. As depicted in FIG. 5, pinion gear 80 is coupled to bottom motor spindle 88 and engages with spur gear 72. As depicted in FIG. 3, a plurality of gear screws 74 secure spur gear 72, gear spacer 68 and coupler 66 together. In this embodiment as depicted in FIG. 4, slip ring 70 is disposed between coupler 66 and spur gear 72.

In this assembled configuration, first and second lower bearings 60, 64 within internal cavity 58 of support block 56 allow coupler 66 to rotate within support block 56. In operation, activation of bottom motor 86 is configured to rotate bottom motor spindle 88 in the clockwise or counterclockwise directions. This rotational movement allows pinion gear 80 to drive spur gear 72. Rotational movement of spur gear 72 transfers through coupler 66 to rotate base plate 50 of main housing 25, thereby rotating spherical member 20 in the clockwise or counterclockwise directions as illustrated by the lower arrow in FIG. 1. In one embodiment, the rotation of bottom motor spindle 88 in a first direction rotates spherical member 20 and any secured item thereto in a clockwise direction. The rotation of bottom motor spindle 88 in a second direction rotates spherical member 20 and any secured item thereto in a counterclockwise direction.

In certain embodiments, top and bottom motors 34, 86 are electrically coupled to a power source such as a battery or power outlet by wires (not shown). In one embodiment, one or more electrical wires extend through slip ring 70 and connect to top motor 34. Slip ring 70 allows the rotation of spur gear 72 without any hindrance due to the presence of the one or more electrical wires extending therethrough.

In one embodiment, top and bottom motors 34, 86 are operably connected to an input device by a wired or wireless connection. The input device may include, but is not limited to, a joystick, keyboard, or other computing device. A user enters feedback in the input device to operate top and bottom motors 34, 86 as desired to rotate spherical ball 20 and the connected item laterally and/or in the clockwise or counterclockwise directions as illustrated by the arrows in FIG. 1.

In one embodiment as depicted in FIG. 6, multiple multi-directional ball rotation apparatuses are secured together using support block 56. Although the figure illustrates four ball rotation apparatuses, it shall be appreciated that any alternative number of ball rotation apparatuses can be coupled to support block 56 as desired. The ball rotation apparatuses can be angled differently relative to support block 56, depending on the item that is to be secured to spherical members 20 of the ball rotation apparatuses. The plurality of ball rotation apparatuses are operably connected to the input device and operated as previously described.

In one embodiment as depicted in FIG. 7, spherical mounting ball 100 is configured to engage with the plurality of spherical members 20 of the ball rotation apparatuses. Spherical mounting ball 100 is beneficial for use when mounting a camera head to the plurality of ball rotation apparatuses. In this embodiment, a plurality of magnetic balls, steel or other ferromagnetic members are disposed within spherical mounting ball 100 to couple it to spherical members 20 of the ball rotation apparatuses.

One or more mounting plates, brackets and/or mechanical fasteners (not shown) are used to secure the camera head to the interior of spherical mounting ball 100. In one embodiment, spherical mounting ball 100 is transparent to enable the secured camera head to capture video images through spherical mounting ball 100. The operation of the plurality of ball rotation apparatuses maneuvers spherical mounting ball 100 and the secured camera head in a plurality of directions as desired to generate video via the camera head.

It shall be appreciated that the components of the ball rotation apparatus can be modified in alternative embodiments. In one alternative embodiment, shaft 16 can be welded to the exterior of spherical member 20 and operably connected to top motor 34 using alternative linkage components. Various other configurations and designs of the ball rotation apparatus are possible within the scope of different embodiments of the invention. It shall be appreciated that the components of the multi-directional ball rotation apparatus described in embodiments of the invention can be welded together or coupled together using any alternative fastening components such as adhesives or other mechanical fasteners in alternative embodiments.

It shall be appreciated that the components of the multi-directional ball rotation apparatus described in several embodiments herein may comprise any alternative known materials in the field and be of any color, size and/or dimensions. It shall be appreciated that the components of the multi-directional ball rotation apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A multi-directional ball rotation apparatus configured to maneuver an item in a plurality of directions, the ball rotation apparatus comprising:
   a main housing comprising a pair of opposing side plates coupled to a base plate;
   a first motor coupled to the main housing and positioned within the pair of opposing side plates and base plate, the motor comprising a first rotatable spindle;
   a shaft rotatably mounted to the pair of opposing side plates of the main housing and operably connected to the first spindle of the motor; and
   a spherical member coupled to the shaft and configured to engage the item;
   wherein rotational movement of the first spindle is configured to drive the shaft to rotate the spherical member laterally, thereby maneuvering the item in one of the plurality of directions; wherein the first spindle of the first motor is configured to rotate in a first direction to rotate the spherical member and item in a first direction, wherein the first spindle of the first motor is configured to rotate in a second direction to rotate the spherical member and item in a second direction;
   a lower housing coupled to the base plate of the main housing and a second motor coupled to the lower housing, the second motor comprising a second rotatable spindle operably connected to the base plate of the main housing by a coupler, wherein rotational movement of the second spindle in a first direction is configured to rotatably drive the coupler and base plate of the main housing in a first direction, thereby rotating the spherical member and item in a clockwise direction, wherein rotational movement of the second spindle in a second direction is configured to rotatably drive the coupler and base plate of the main housing in a second direction, thereby rotating the spherical member and item in a counterclockwise direction.

2. The multi-directional ball rotation apparatus of claim 1, further comprising a pinion gear coupled to the second spindle of the second motor and a spur gear directly attached to the coupler and engaged with the pinion gear.

3. The multi-directional ball rotation apparatus of claim 2, further comprising a worm coupled to the first spindle of the first motor and a worm gear directly attached to the shaft and engaged with the worm.

4. The multi-directional ball rotation apparatus of claim 3, wherein the lower housing comprises a support block coupled to the base plate of the main housing and comprising an internal cavity, the internal cavity of the support block configured to permit the coupler to extend therethrough.

5. The multi-directional ball rotation apparatus of claim 4, further comprising a pair of lower bearings secured within the internal cavity of the support block and disposed around the coupler.

6. The multi-directional ball rotation apparatus of claim 5, further comprising a slip ring dis-posed on the spur gear and extending within the coupler, and a spacer disposed between the spur gear and coupler.

7. The multi-directional ball rotation apparatus of claim 6, wherein the lower housing comprises a lower plate coupled to the support block and directly attached to the second motor.

8. The multi-directional ball rotation apparatus of claim 7, wherein the shaft comprises op-posing ends coupled to a pair of shaft bearings supported by the pair of opposing side plates of the main housing, the shaft extending entirely through both the spherical member and the worm gear.

9. The multi-directional ball rotation apparatus of claim 8, further comprising an upper ring coupled to the pair of opposing side plates of the man housing so that the pair of shaft bearings is secured between the upper ring and pair of opposing side plates.

* * * * *